Figure 1:
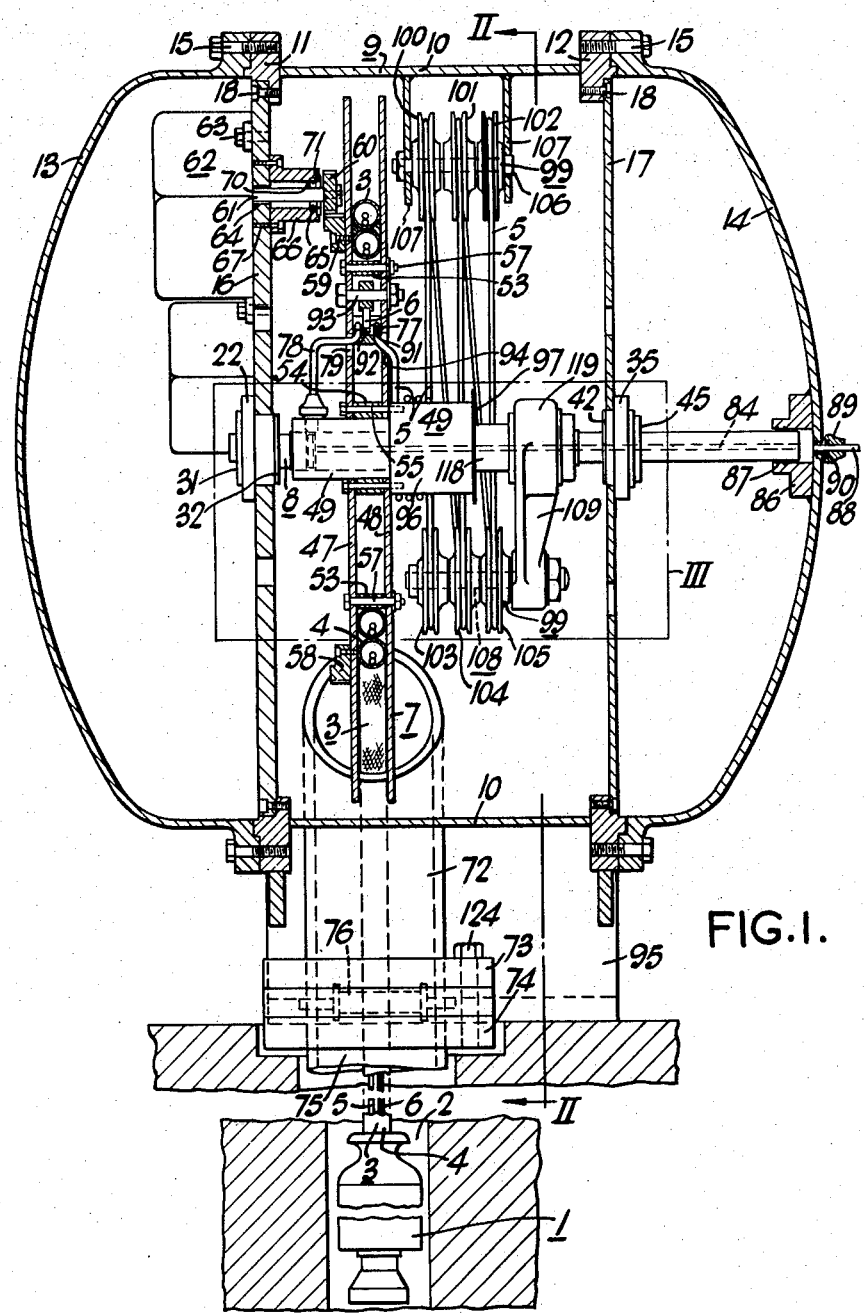

United States Patent Office 3,145,725
Patented Aug. 25, 1964

3,145,725
WINDING APPARATUS FOR FLUID CONDUCTING HOSE COMBINED WITH ELECTRICITY CONDUCTING WIRES
Herbert Chilvers Knights, Culcheth, near Warrington, England, assignor to United Kingdom Atomic Energy Authority, London, England
Filed Jan. 3, 1961, Ser. No. 80,334
Claims priority, application Great Britain Jan. 15, 1960
2 Claims. (Cl. 137—355.17)

This invention relates to winding apparatus suitable for storage of cable in the form of a fluid conducting hose having electricity conducting wires passing along the inside of the hose.

In supplying mobile equipment, such as a television camera inside a nuclear reactor, from a static supply point with electrical connections and fluid such as coolant gas, a cable in the form of a hose with internal electrical connections may be employed which is stored on a rotatable reel and paid off as required by rotation of the reel. In such an arrangement the cable or hose will have a first part which is wound on the reel and leads to the mobile equipment and a second part which leads from the reel to the static supply point. It follows that if the cable or hose is fixed to the reel at the point at which it passes from the reel to the supply point that length of the cable or hose between the reel and the supply point will be twisted as the reel rotates. In the absence of any rotatable joints in the cable or hose the number of turns stored on the reel will be limited by the above twisting effect.

In any event, continual use with the consequent continual twisting may give rise to internal damage, pinching, or even fracture of the cable or hose. The problem can be overcome by using rotatable joints for the electrical connections for example by providing electrical slip rings at the reel to accommodate for rotation of the reel. In the case of hoses supplying fluid the problem can be overcome by the provision of a rotatable fluid coupling. Such a method employing slip rings is not suitable for a multicore electrical cable, such as is used in supplying a television camera, because the number of slip rings required is prohibitive and difficulties arise due to varying contact resistance of the slip rings.

According to the invention winding apparatus for a cable in the form of a fluid conducting hose having an electrically conducting lead inside the hose, comprises first and second winding reels on a common axis and arranged to be rotated together the hose part of the cable being terminated on the first reel at a rotatable fluid coupling and the electrically conducting lead of the cable continuing from the first reel round the second reel which it leaves tangentially and passes to a fixed supply point so that the lead winds out off said second reel as the reels rotate without twist occurring in the length of lead between the second reel and the fixed supply point.

In this arrangement a length of the electrically conducting lead appears off the second reel in certain positions of the reel and accordingly an expansible pulley system can be provided to store the length of electrically conducting lead between the second reel and the fixed supply point in the confinement of a space having a maximum dimension less than that required by said length of lead hanging free between the second reel and the fixed supply point. In this manner the apparatus is well suited for use in connection with a pressurised system as its overall dimensions can be kept small for containment in a pressurised container. Preferably both first and second reels are kept as small as possible in overall dimensions having in mind the duty they have to perform. In general the first reel will be the larger as it has to accommodate the hose part of the cable. The second reel accommodating the electrically conducting lead can be smaller and the smaller the second reel is the shorter the length of lead to be accommodated by the expansible pulley arrangement.

Figure 2:
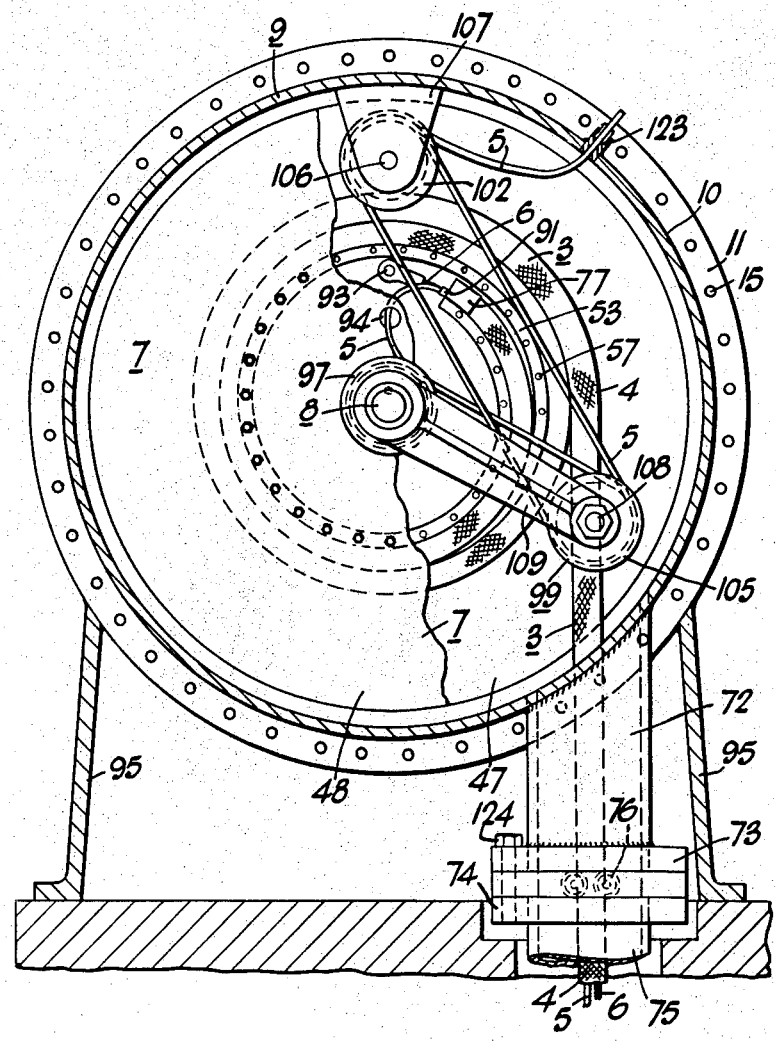
Figure 3:
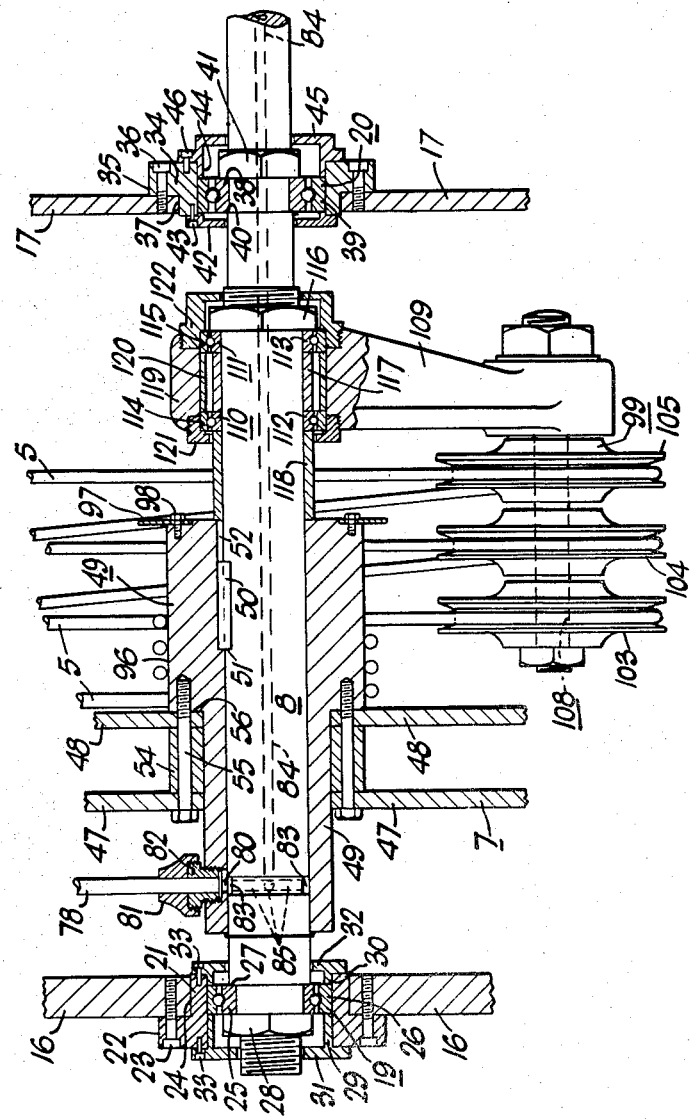

One embodiment of the invention will now be described by way of example with reference to the accompanying drawings in which:

FIG. 1 is a sectional front elevation.
FIG. 2 is a section along the line II—II in FIG. 1.
FIG. 3 is a detail of FIG. 1 in the area bounded by the rectangle III in FIG. 1.

In the drawings there is shown a television camera 1 of elongated cylindrical form adapted to be lowered down a narrow vertical fuel element channel 2 in the core structure of a nuclear reactor so that objects in the channel can be located and examined and so that the channel itself can be viewed. The camera 1 is suspended from a cable 3 which has the dual function of providing support for the camera 1 and supplying coolant gas and electrical connections thereto. The cable 3 which comprises an armored hose 4 containing a multicore television lead 5 and a core of cabled wire rope 6 is stored on a rotatable hose reel 7. The reel 7 is rotatable on a shaft 8 mounted axially in a casing 9 of generally cylindrical form. The casing 9 comprises a cylindrical center section 10 having end flanges 11 and 12 welded thereto, and domed end covers 13 and 14 fixed respectively at the end flanges 11 and 12 by bolts 15. The casing 10 is divided transversely by two circular plates 16 and 17 fixed at the flanges 11 and 12 by bolts 18. As shown in FIG. 3 the shaft 8 is rotatable in bearings 19 and 20 respectively mounted at the center of the plates 16 and 17. The bearing 19 is mounted in a sleeve 21 having an end flange 22 at which it is fixed by bolts 23 in an aperture 24 at the center of the plate 16. The bearing 19 has an inner race 25 and an outer race 26, the inner race 25 being clamped between an external shoulder 27 on the shaft 8 and a nut 28 screwed on the corresponding end of the shaft 8. The outer race 26 of the bearing 19 is a push fit in the sleeve 21 and is clamped between cylindrical extensions 29 and 30 of cover plates 31 and 32 fixed to the ends of the sleeve 21 by bolts 33.

The bearing 20 is mounted in a sleeve 34 having an end flange 35 at which it is fixed by bolts 36 in an aperture 37 at the center of the plate 17. The bearing 20 has an inner race 38 and an outer race 39, the inner race 38 being clamped between an external shoulder 40 on the shaft 8 and a nut 41 screwed on the shaft 8. The outer race 39 of the bearing 20 is a push fit in the sleeve 34 and is clamped between a cover plate 42 fixed to one end of the sleeve 34 by bolts 43 and a cylindrical extension 44 of a cover plate 45 fixed to the other end of the sleeve 34 by bolts 46.

The hose reel 7 comprises two parallel circular side flanges 47 and 48 mounted on a central sleeve 49. The sleeve 49 is a close fit on the shaft 8 and is fixed thereto by a key 50 engaging with longitudinal keyways 51 and 52 in the shaft 8 and the sleeve 49. The side flanges 47 and 48 are spaced apart by a spiral member 53 (see FIGS. 1 and 2) defining the depth of the reel 7 and a spacer sleeve 54 which is a close fit on the sleeve 49. The spacer sleeve 54 is clamped between the flanges 47 and 48 by bolts 55 which screw into and clamp the assembly against the face of an external shoulder 56 on the sleeve 49. The spiral member 53 is held between the side flanges 47 and 48 by bolts 57. A ring gear 58 is fixed to the side flange 47 of the reel 7 by bolts 59 and a driving pinion 60 engaging with the ring gear 58 is carried by the drive shaft 61 of a motor 62 which is mounted on the plate 16 by bolts 63. The drive shaft 61 of the motor 62 projects through an aperture 64 in the plate 16 and is supported at its outer end by a bearing 65 which is mounted in a flanged sleeve 66 fixed to the plate 16 by bolts 67. The bearing 65 is fitted on the drive shaft 61 and is a push fit in the end of the sleeve 66 being clamped therein by a ring nut 71 screwed into the end of the sleeve 66.

The cable 3 is wound on the reel 7 between the flanges 47 and 48 in the form of a flat spiral coil each turn being wound on the preceding turn. The cable 3 passes from the reel 7 out of the casing 9 through a branch pipe 72 welded in connection with the cylindrical center section 10 of the casing 9. The branch pipe 72 has an end flange 73 providing connection by bolts 124 with the flanged upper end 74 of a standpipe 75 which gives access to the fuel element channel 2 in which the television camera 1 is suspended from the cable 3. Spring loaded guide rollers 76 for the cable 2 are provided in the branch pipe 72 and the casing 9 has feet 95 for supporting it in position over the standpipe 75.

The hose 4 which forms part of the cable 3 terminates at a gas tight connector 77 mounted on the reel 7 between the flanges 47 and 48. A pipe 78 leading from the connector 77 passes through an aperture 79 in the flange 47 of the reel 7 and is connected with a drilling 80 in the sleeve 49 (see FIG. 3) by a union nut 81 which screws onto a corresponding union adapter 82 fitted in connection with the drilling 80. The drilling 80 connects with an annular groove 83 in the shaft 8 which has an axial passageway 84 connected by radial drillings 85 with the annular groove 83. The shaft 8 extends through the plate 17 into a bushing 86 welded inside the domed end cover 14 of the casing 9. The shaft 8 is rotatably sealed in the bushing 86 by rubber O-rings 87 and a gas pipe 88 is connected with the bushing 86 through the end cover plate 14 by means of a union nut 89 and a union adaptor 90.

The television lead 5 and the wire rope core 6 of the cable 3 pass through gas tight glands 91 and 92 in the connector 77. The wire rope core 6 is shackled to a bolt 93 extending between the side flanges 47 and 48 of the reel 7 while the television lead 5 passes through an aperture 94 in the side flange 48 and is wound round a part 96 of the sleeve 49 on which the reel 7 is mounted. The part 96 of the sleeve 49 is fitted with an end flange 97 fixed by bolts 98, forming a second reel, and the television lead 5 is wound around the part 96 in the same sense as the cable 3 is wound on the reel 7. From the part 96 of the sleeve 49 the television lead 5 passes round an expansible pulley system 99 comprising three fixed pulleys 100, 101 and 102 and three movable pulleys 103, 104 and 105. The three fixed pulleys 100, 101 and 102 are rotatable on a shaft 106 which extends between brackets 107 welded inside the center section 10 of the casing 9. The three movable pulleys 103, 104 and 105 are carried by a shaft 108 mounted on a pivoted arm 109. The arm 109 is mounted to rotate on the shaft 8 by bearings 110 and 111 (see FIG. 3). The bearings 110 and 111 respectively have inner races 112 and 113 and outer races 114 and 115. The inner races 112 and 113 of the bearings 110 and 111 are a close fit on the shaft 8 and are clamped on the shaft 8 by a nut 116 in conjunction with spacer sleeves 117 and 118. The arm 109 has an end boss 119 and the outer races 114 and 115 of the bearings 110 and 111 are a push fit in the boss 119 and are separated by a spacer sleeve 120. The races 114 and 115 are retained in position by cover plates 121 and 122 screwed into each end of the boss 119. From the part 96 of the sleeve 49 the television lead 5 passes firstly over the movable pulley 103 then over the fixed pulley 100, next over the movable pulley 104 then over the fixed pulley 101 etc. After finally passing over the fixed pulley 102 the television lead 5 passes out of the casing 9 through a gland 123 in the cylindrical center section 10 and is connected with a television monitor (not shown).

In use of the arrangement the television camera 1 is lowered down the fuel element channel 2 by rotating the reel 7 clockwise (as viewed in FIG. 2), the motor 62 driving the reel 7 through the pinion 60 and the ring gear 58. Rotation of the reel 7 to pay off the cable 3 also causes unwinding of the television lead 5 from the part 96 of the sleeve 49 on which the reel 7 is supported. The loop of television lead 5 unwound from the part 96 of the sleeve 49 is accommodated by the pulley system 99 because as the television lead unwinds the arm 109 rotates clockwise under its own weight to take up the slack.

To raise the television camera 1 the reel is rotated counterclockwise which causes the television lead 5 to be drawn off from the pulley system 99 and wound on the part 96 of the sleeve 49. As the television camera 1 is raised the arm 109 of the pulley system 99 rotates counterclockwise as the length of the television lead 5 occupying the pulley system 99 decreases.

While the television camera 1 occupies the fuel element channel 1 coolant carbon dioxide gas is supplied through the hose 4. The carbon dioxide is supplied through the pipe 88 at the cover plate 14 and passes through the passageway 84 and radial drillings 85 in the shaft 8 to the annular groove 83 in the shaft 8. From the annular groove 83 the carbon dioxide passes through the drilling 80 in the sleeve 49 and then to the hose 4 through the pipe 78.

I claim:

1. Winding apparatus comprising first and second winding reels on a first common axis and arranged to be rotated together, a first group of pulleys on a second common axis disposed parallel to the first common axis, means for supporting said first group of pulleys for oscillation about said first common axis, a second group of pulleys on a third common axis disposed parallel to the second common axis, means for supporting said second group of pulleys with the third common axis in fixed relationship to the first common axis, a cable in the form of a fluid conducting hose having an electrically conducting lead inside the hose, the hose part of the cable being terminated on the first reel at a rotatable fluid coupling, the said electrically conducting lead of the cable continuing from the first reel, around the second reel, then to and around a first pulley of the first group of pulleys, to and around a first pulley of the second group of pulleys and in series manner to and around the remaining pulleys of each group thence tangentially from the final pulley of the second group of pulleys to a fixed supply point.

2. Winding apparatus according to claim 1, and further comprising a pressure vessel for housing said apparatus, said pressure vessel having a cable outlet aperture, a glanded outlet aperture for said electrically conducting lead extending to a fixed supply point, means for supplying fluid through said pressure vessel to said rotatable fluid coupling and means mounted within said pressure vessel for rotating said first and second winding reels.

References Cited in the file of this patent

UNITED STATES PATENTS 1,380,549    Flood _____ June 7, 1921
2,629,027    Piatt _____ Feb. 17, 1953